US012659413B2

(12) United States Patent
Mori

(10) Patent No.: US 12,659,413 B2
(45) Date of Patent: Jun. 16, 2026

(54) INFORMATION PROCESSING APPARATUS AND METHOD TO RECEIVE INPUT FOR AN AGREEMENT IN RESPONSE TO APPROVERS APPROVING THE AGREEMENT, AND NON-TRANSITORY COMPUTER READABLE MEDIUM

(71) Applicant: FUJIFILM Business Innovation Corp., Tokyo (JP)

(72) Inventor: Atsushi Mori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/183,301

(22) Filed: Mar. 14, 2023

(65) Prior Publication Data

US 2024/0073328 A1 Feb. 29, 2024

(30) Foreign Application Priority Data

Aug. 31, 2022 (JP) ................................. 2022-138408

(51) Int. Cl.
*H04N 1/00* (2006.01)
(52) U.S. Cl.
CPC ..... *H04N 1/00344* (2013.01); *H04N 1/00424* (2013.01); *H04N 2201/0082* (2013.01)

(58) Field of Classification Search
None
See application file for complete search history.

(56) References Cited

U.S. PATENT DOCUMENTS

| | | | | |
|---|---|---|---|---|
| 2010/0073714 | A1* | 3/2010 | Mochizuki | G06F 3/1224 358/1.15 |
| 2016/0171626 | A1* | 6/2016 | Shimkus | G06Q 10/10 705/26.35 |
| 2017/0195523 | A1* | 7/2017 | Lim | H04L 67/125 |
| 2020/0219598 | A1* | 7/2020 | Schneider | G16H 10/60 |
| 2022/0398218 | A1* | 12/2022 | Ikeda | G06F 16/168 |

FOREIGN PATENT DOCUMENTS

| | | |
|---|---|---|
| JP | 2002-099843 A | 4/2002 |
| JP | 2008-269551 A | 11/2008 |
| JP | 4638131 B2 | 2/2011 |
| JP | 5870864 B2 | 3/2016 |

* cited by examiner

*Primary Examiner* — Haris Sabah
(74) *Attorney, Agent, or Firm* — Oliff PLC

(57) ABSTRACT

An information processing apparatus includes a processor configured to: receive input for an agreement for a predetermined apparatus; present, to approvers, a written agreement generated on a basis of content of the received input; and cause the agreement to be concluded in response to the approvers approving the agreement and cause the predetermined apparatus to implement a setting relevant to content of the written agreement.

10 Claims, 10 Drawing Sheets

Agreement

XXX shall provide YYY with ...

| Automatic ordering | Conditions for ordering | ... |
|---|---|---|
| Paper | Remaining amount 30% | ... |
| Toner | Remaining amount 20% | ... |

Signature (XXX)     Signature (YYY)

32

OK

34

CANCEL

1

INFORMATION PROCESSING APPARATUS AND METHOD TO RECEIVE INPUT FOR AN AGREEMENT IN RESPONSE TO APPROVERS APPROVING THE AGREEMENT, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-138408 filed Aug. 31, 2022.

BACKGROUND

(i) Technical Field

The present disclosure relates to an information processing apparatus, a non-transitory computer readable medium, and an information processing method.

(ii) Related Art

Japanese Unexamined Patent Application Publication No. 2008-269551 describes technology for clarifying the content of business negotiations and simplifying the form of a written agreement.

SUMMARY

To date, to implement settings on a predetermined apparatus, an agreement between a provider and a user of the apparatus is required to be concluded in advance in some cases. Processes until the conclusion of the agreement may be divided into generating a written agreement and approving the written agreement by approvers.

The approval process at this time has been performed by a person as manual work in the related art in such a manner that a person has taken the written agreement with them to an approver and has requested approval, and thus the approval process has not necessarily been managed from the viewpoint of a system. In addition, in the related art, the date of implementation has been decided after the agreement is concluded, and a worker specified by the provider has visited an apparatus installation place on the date of implementation and has implemented the settings on the apparatus. Since the date of implementation has been decided through manual work by people such as scheduling communication between concerned parties, the implementation process has not necessarily been managed from the viewpoint of a system.

Aspects of non-limiting embodiments of the present disclosure relate to an information processing apparatus enabled to manage, in an integrated manner, processes from agreement conclusion to setting implementation if an agreement is required in advance to implement settings on a predetermined apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: receive input for an agreement for a predetermined apparatus; present, to approvers, a written agreement generated on a basis of content of the received input; and cause the agreement to be concluded in response to the approvers approving the agreement and cause the predetermined apparatus to implement a setting relevant to content of the written agreement.

BRIEF DESCRIPTION OF THE DRAWINGS

Exemplary embodiments of the present disclosure will be described in detail based on the following figures, wherein:

FIG. 7 illustrates a second example display on the display of the server;

DETAILED DESCRIPTION

Hereinafter, an information processing system 10 according to exemplary embodiments will be described.

First Exemplary Embodiment

First, a first exemplary embodiment of the information processing system 10 according to this exemplary embodiment will be described.

Figure 1:
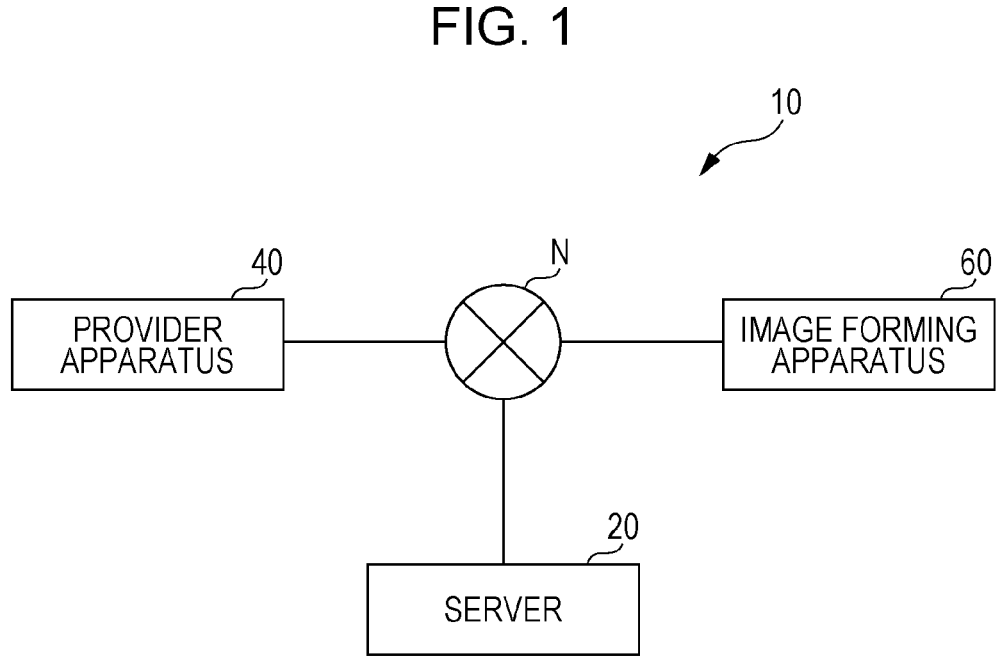
FIG. 1 is a view illustrating the schematic configuration of an information processing system.

FIG. 1 is a view illustrating the schematic configuration of the information processing system 10.

As illustrated in FIG. 1, the information processing system 10 includes a server 20, a provider apparatus 40, and an image forming apparatus 60. The server 20, the provider apparatus 40, and the image forming apparatus 60 are connected with a network N interposed therebetween and are allowed to communicate with each other. In the first exemplary embodiment, the server 20 is an example of an information processing apparatus.

Figure 2:
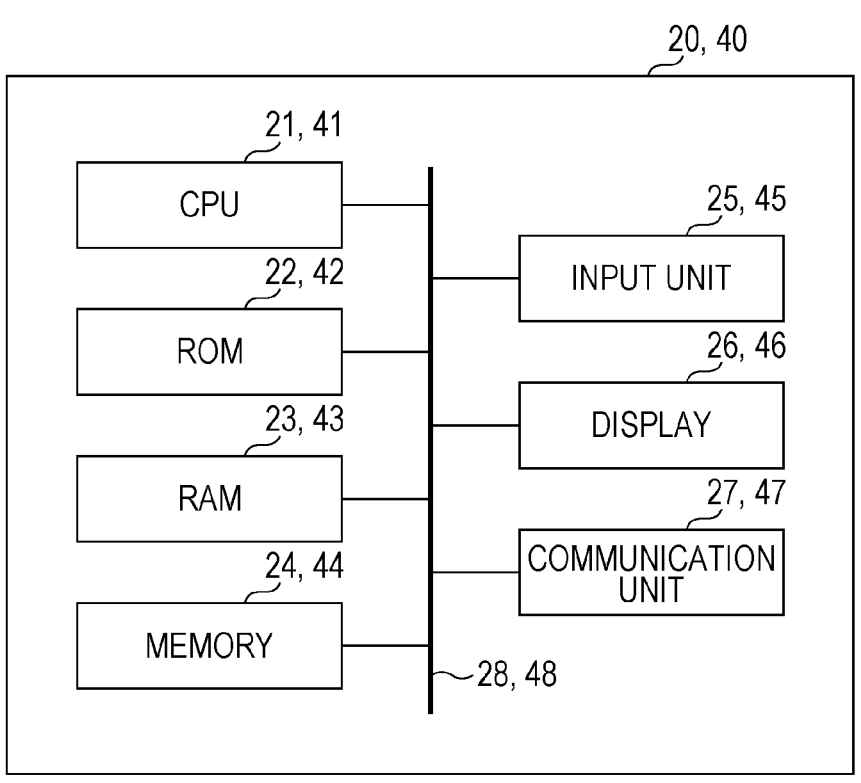
FIG. 2 is a block diagram illustrating the hardware configuration of a server and a provider apparatus.

FIG. 2 is a block diagram illustrating the hardware configuration of the server 20 and the provider apparatus 40. In the first exemplary embodiment, in an example, the server 20 is a server computer, and the provider apparatus 40 is a personal computer (PC). Since the server 20 and the provider apparatus 40 have basically a general computer configuration, and the server 20 is described as a representative.

As illustrated in FIG. 2, the server 20 includes a central processing unit (CPU) 21, a read only memory (ROM) 22, a random access memory (RAM) 23, a memory 24, an input unit 25, a display 26, and a communication unit 27. The components are connected with a bus 28 interposed therebetween to be able to communicate with each other.

The CPU 21, for example, runs various programs and controls the components. The CPU 21 thus reads out a program from the ROM 22 or the memory 24 and runs the program by using the RAM 23 as a work area. The CPU 21 performs control of the components and various arithmetic operations in accordance with an appropriate program stored in the ROM 22 or the memory 24. The ROM 22 or the memory 24 stores an information processing program for executing at least an implementation process (described later). The information processing program may be stored in the server 20 in advance or may be appropriately installed in the server 20 in such a manner as to be stored in a nonvolatile storage medium or distributed via the network N. Conceivable examples of the nonvolatile storage medium include a compact disk (CD)-ROM, a magneto-optical disk, a hard disk drive (HDD), a digital video disk (DVD)-ROM, a flash memory, and a memory card. The CPU 21 is an example of a processor.

The ROM 22 stores various programs and various pieces of data. The RAM 23 serves as the work area and temporarily stores a program or data.

The memory 24 is composed of a memory device such as a HDD, a solid state drive (SSD), or a flash memory and stores various programs including the operating system and various pieces of data.

The input unit 25 includes, for example, a pointing device such as a mouse, various buttons, a keyboard, a microphone, and a camera and is used for various inputting operations.

The display 26 is, for example, a liquid crystal display and displays various pieces of information. The display 26 may employ a touch panel system to serve as the input unit 25.

The communication unit 27 is an interface for communications with a different apparatus. For the communications, for example, a wired communication standard such as Ethernet (registered trademark) or FDDI or a wireless communication standard such as 4G, 5G, or Wi-Fi (registered trademark) is used.

In running the information processing program, the server 20 executes a process based on the information processing program by using the hardware resources described above.

A CPU 41, a ROM 42, a RAM 43, a memory 44, an input unit 45, a display 46, a communication unit 47, and a bus 48 of the provider apparatus 40 have the same functions as the functions of the CPU 21, the ROM 22, the RAM 23, the memory 24, the input unit 25, the display 26, the communication unit 27, and the bus 28 of the server 20 described above.

Figure 3:
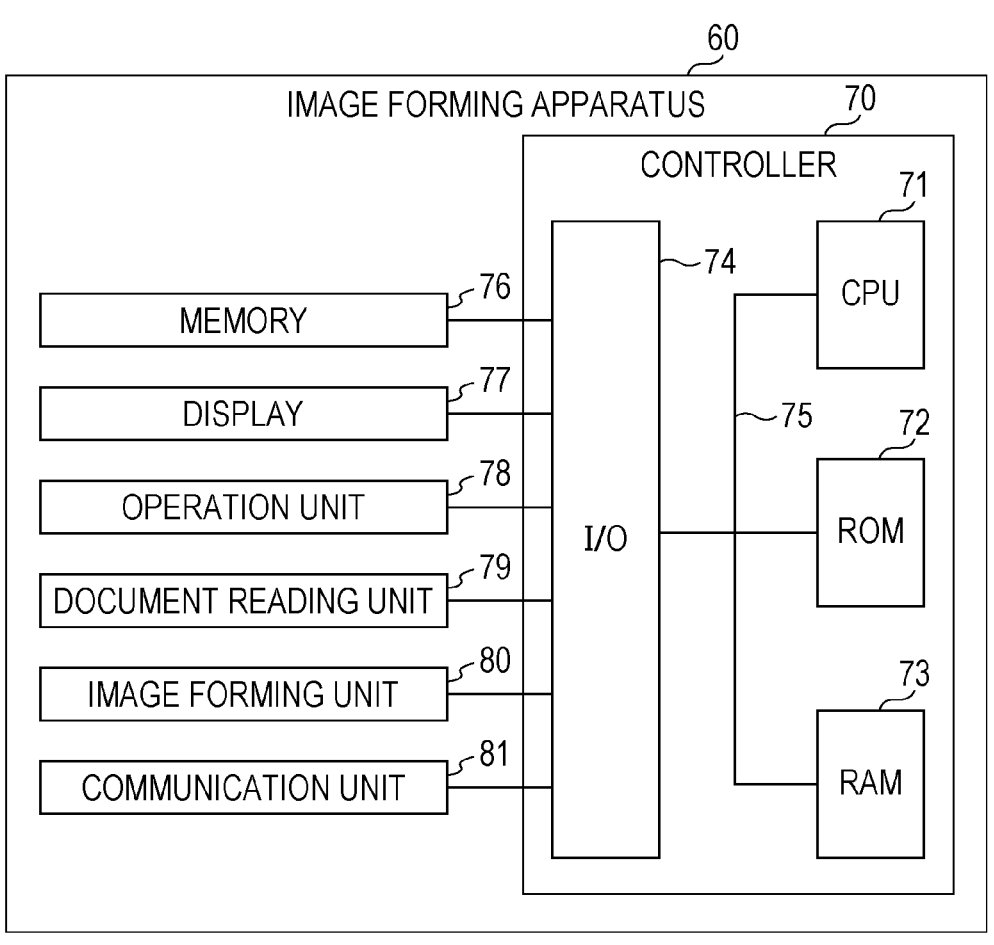
FIG. 3 is a block diagram illustrating the hardware configuration of an image forming apparatus.

FIG. 3 is a block diagram illustrating the hardware configuration of the image forming apparatus 60.

As illustrated in FIG. 3, the image forming apparatus 60 serving as an example of a predetermined apparatus includes a controller 70 that controls operations of the image forming apparatus 60. In the controller 70, a CPU 71, a ROM 72, a RAM 73, and an input/output interface (I/O) 74 are connected with a bus 75 interposed therebetween to be able to communicate with each other.

The CPU 71, for example, runs various programs and controls the components. The CPU 71 thus reads out a program from the ROM 72 or a memory 76 (described later) and runs the program by using the RAM 73 as a work area. The CPU 71 performs control of the components and various arithmetic operations in accordance with an appropriate program recorded in the ROM 72 or the memory 76.

The ROM 72 stores various programs and various pieces of data. The RAM 73 serves as the work area and temporarily stores a program or data.

To the I/O 74, the memory 76, a display 77, an operation unit 78, a document reading unit 79, an image forming unit 80, and a communication unit 81 are connected. These components are configured to be able to communicate with the CPU 71 via the I/O 74.

The memory 76 is composed of a memory device such as a HDD, a SSD, or a flash memory or the like and stores various programs and various pieces of data.

As the display 77, for example, a liquid crystal display or an organic electro luminescence (EL) display is used. The display 77 integrally has a touch panel.

The operation unit 78 is provided with various operation keys such as numeric keys and a Start key.

The display 77 and the operation unit 78 receive various instructions from a user of the image forming apparatus 60. Examples of the instructions include an instruction to start reading a document and an instruction to start copying a document. The display 77 displays various pieces of information such as the result of a process executed in response to an instruction from the user and a report of the process.

The document reading unit 79 takes in, sheet by sheet, a document placed on the sheet feeder tray of an auto document feeder (not illustrated) provided on top of the image forming apparatus 60 and acquires image information by optically reading the taken document. Alternatively, the document reading unit 79 acquires image information by optically reading the document placed on the flat bed such as platen glass.

The image forming unit 80 forms, on the recording medium such as a paper sheet, an image based on the image information acquired by the reading by the document reading unit 79 or image information acquired by an external PC connected with the network N interposed therebetween.

The communication unit 81 is an interface for communications with a different apparatus. For the communications, for example, a wired communication standard such as Ethernet (registered trademark) or FDDI or a wireless communication standard such as 4G, 5G, or Wi-Fi (registered trademark) is used.

Figure 4:
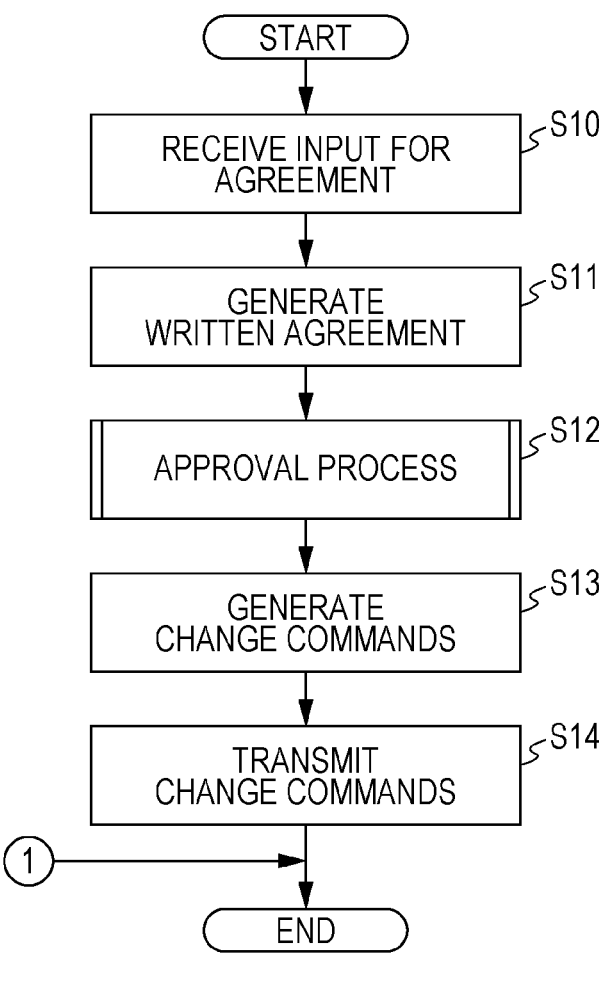
FIG. 4 is a first flowchart illustrating implementation process flow.

FIG. 4 is a flowchart illustrating implementation process flow for causing the provider apparatus 40 and the image forming apparatus 60 to implement settings relevant to the content of a written agreement. The implementation process is executed in such a manner that the CPU 21 reads out the information processing program from the ROM 22 or the memory 24, loads the program into the RAM 23, and runs the program.

In step S10, the CPU 21 receives input for an agreement for the image forming apparatus 60. The CPU 21 then proceeds to step S11. The agreement includes a new agreement for purchasing or leasing the image forming apparatus 60, an amendment agreement to change the content of the concluded agreement, and the like.

In step S11, the CPU 21 generates a written agreement for the agreement for the image forming apparatus 60 relevant to the content of the input received in step S10. The CPU 21 then proceeds to step S12.

In step S12, the CPU 21 executes an approval process in which the written agreement generated in step S11 is presented to approvers to request approval. The details of the approval process are described later. If the approvers approve the agreement, the CPU 21 proceeds to step S13.

In step S13, the CPU 21 generates change commands for causing the provider apparatus 40 and the image forming apparatus 60 to implement the settings relevant to the content of the written agreement generated in step S11. Specifically, the CPU 21 generates the respective change commands for the provider apparatus 40 and the image forming apparatus 60. The CPU 21 then proceeds to step S14.

In step S14, the CPU 21 transmits the change commands generated in step S13 to the provider apparatus 40 and the image forming apparatus 60 and thereby causes the provider apparatus 40 and the image forming apparatus 60 to implement the settings relevant to the content of the written agreement. In the provider apparatus 40 having acquired the change command, the CPU 41 changes registration information related to the image forming apparatus 60 represented in the change command to have content relevant to the change command. In the image forming apparatus 60 having acquired the change command, the CPU 71 changes settings to have content relevant to the change command. The implementation process is then terminated.

As described above, the server 20 may manage processes from agreement conclusion to setting implementation in an integrated manner if an agreement is required in advance to implement settings on the image forming apparatus 60.

Figure 5:
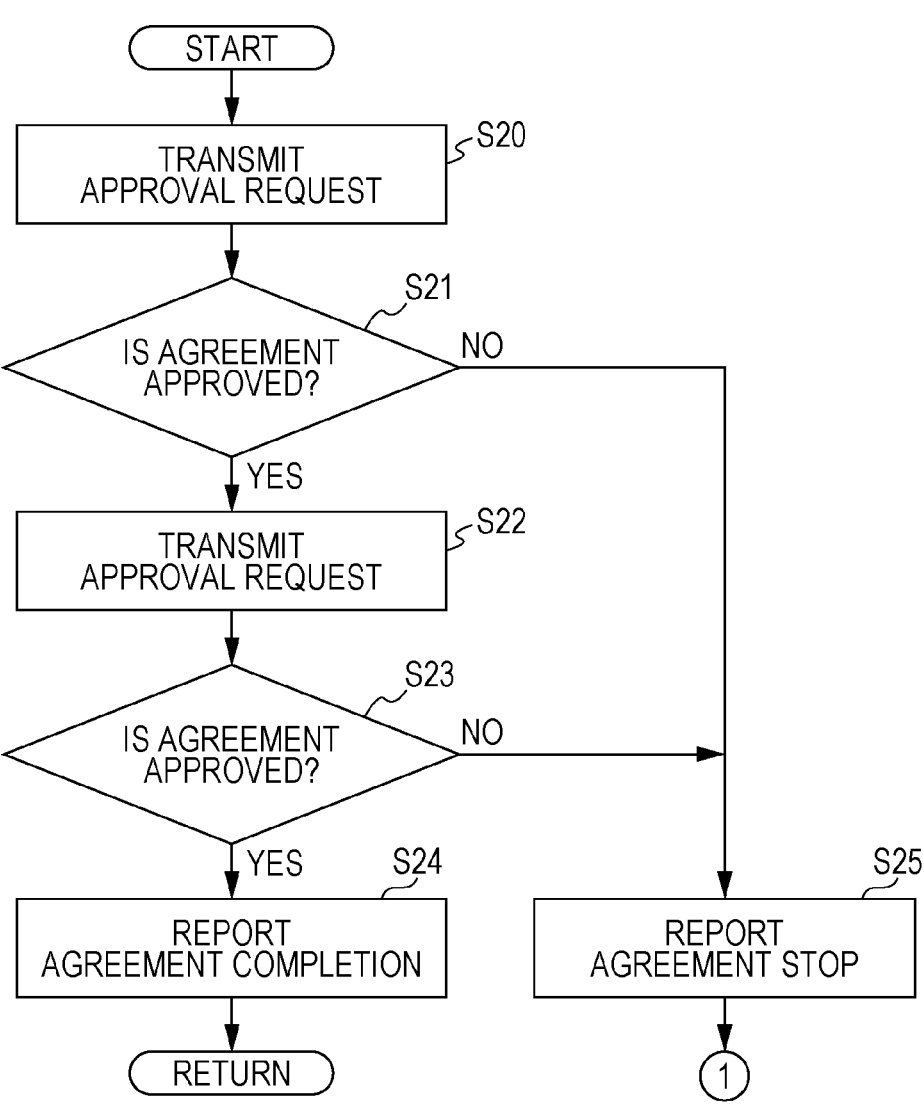
FIG. 5 is a second flowchart illustrating implementation process flow.

The details of the approval process in step S12 in FIG. 4 will then be described by using FIG. 5.

In step S20, the CPU 21 transmits, to the terminal of one of the approvers, the written agreement generated in step S11 in FIG. 4 and a request for approving the written agreement. The approvers are present for the respective parties to the agreement, that is, the provider and the user of the image forming apparatus 60, and the written agreement is presented to the approvers in the order from the provider to the user. In step S20, the CPU 21 thus transmits the written agreement and the approval request to the terminal of the provider approver. The CPU 21 then proceeds to step S21.

In step S21, the CPU 21 determines whether the provider approver approves the agreement. If the CPU 21 determines that the provider approver approves the agreement (step S21: YES), the CPU 21 proceeds to step S22. In contrast, if the CPU 21 determines that the provider approver does not approve the agreement (step S21: NO), the CPU 21 proceeds to step S25. In an example, if an approval report responding to the approval request is acquired from the terminal of the approver, the CPU 21 determines that the approver approves the agreement. If a rejection report responding to the approval request is acquired, the CPU 21 determines that the approver does not approve the agreement.

In step S22, the CPU 21 transmits, to the terminal of the user approver, the written agreement generated in step S11 in FIG. 4 and a request for approving the written agreement. The CPU 21 then proceeds to step S23.

In step S23, the CPU 21 determines whether the user approver approves the agreement. If the CPU 21 determines that the user approver approves the agreement (step S23: YES), the CPU 21 proceeds to step S24. In contrast, if the CPU 21 determines that the user approver does not approve the agreement (step S23: NO), the CPU 21 proceeds to step S25.

In step S24, the CPU 21 transmits a report indicating that the agreement is completed to the respective terminals of the provider approver and the user approver. The CPU 21 then proceeds to step S13.

In step S25, the CPU 21 transmits a report indicating that the agreement is stopped to the respective terminals of the provider approver and the user approver. The CPU 21 then terminates the implementation process.

As described above, in the server 20, the CPU 21 presents the written agreement to the approvers in the predetermined order. The server 20 may thereby present the written agreement to the approvers more smoothly than in a case where the order of presenting the written agreement is not decided in advance.

In the server 20, the CPU 21 causes the agreement to be concluded in response to all of the approvers approving the agreement and causes the provider apparatus 40 and the image forming apparatus 60 to implement the settings relevant to the content of the written agreement. Accordingly, if any of the approvers does not approve the agreement, the server 20 may prevent the provider apparatus 40 and the image forming apparatus 60 from implementing the settings relevant to the content of the written agreement.

If any of the approvers does not approve the agreement, the CPU 21 stops the agreement in the server 20. Accordingly, only in a case where all of the approvers approve the agreement, the server 20 may cause the provider apparatus 40 and the image forming apparatus 60 to implement the settings relevant to the content of the written agreement.

Display examples based on the implementation process illustrated in FIG. 4 in the first exemplary embodiment will then be described.

Figure 6:
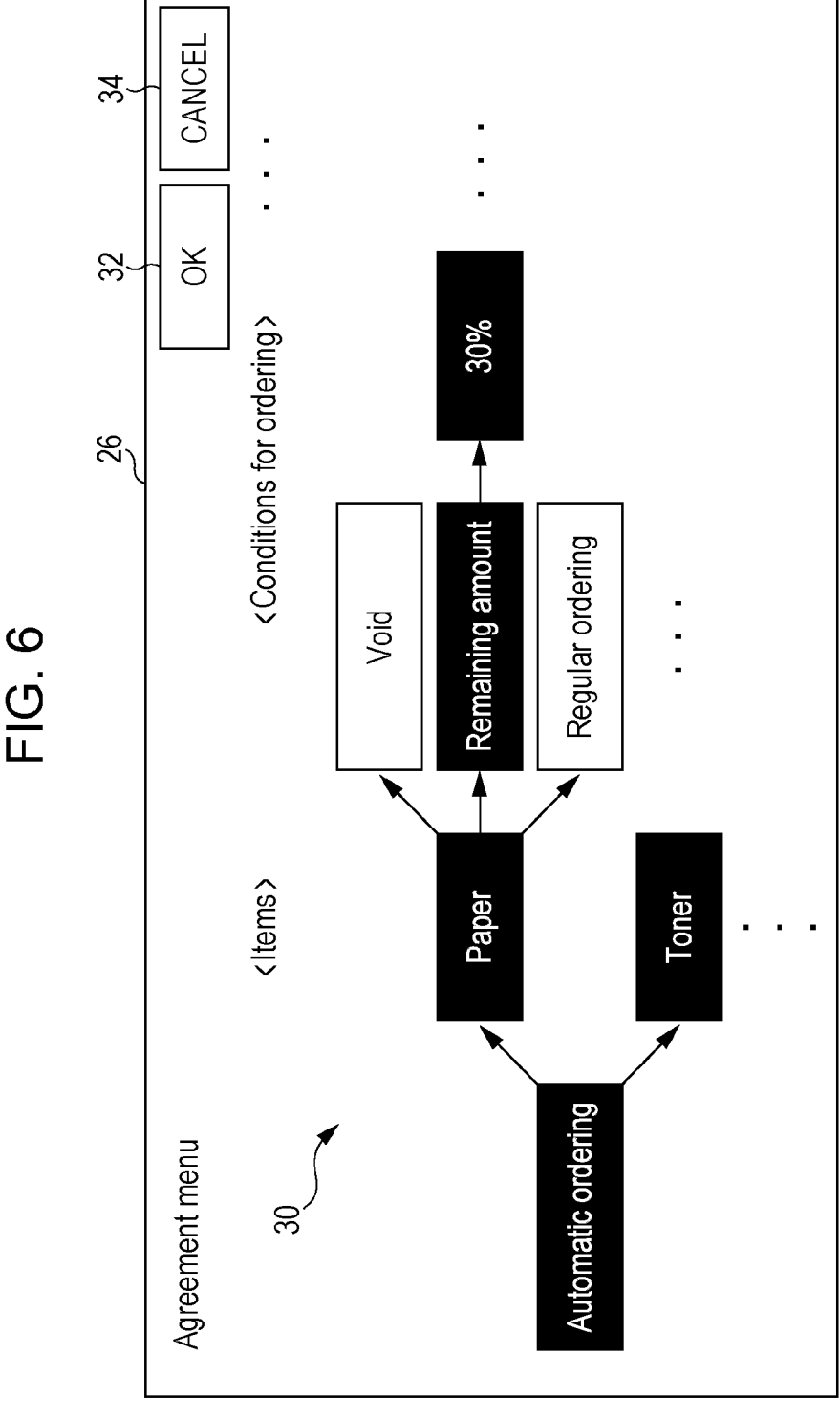
FIG. 6 illustrates a first example display on a display of the server.

FIG. 6 illustrates a first example display on the display 26 of the server 20. For example, in step S10 illustrated in FIG. 4, the CPU 21 causes the display 26 to display the display example illustrated in FIG. 6.

In the display example illustrated in FIG. 6, an agreement input part 30, an OK button 32, and a CANCEL button 34 are displayed.

The agreement input part 30 is a part where various requirements in the agreement for the image forming apparatus 60 are input. Although FIG. 6 exemplifies Items and Conditions for ordering as the requirements, the content of the requirements is not limited.

Rectangular fields filled with black in the agreement input part 30 represent various requirements for which input is received. Specifically, FIG. 6 illustrates a state where in the agreement input part 30, inputting Paper and Toner for Items for Automatic ordering is received is received, and inputting Remaining amount and 30% for Conditions for ordering for Paper is received.

If the OK button 32 is operated in the state illustrated in FIG. 6, the CPU 21 proceeds to step S11 illustrated in FIG. 4 and generates the written agreement relevant to the various requirements for which input is received in the agreement input part 30. For example, the CPU 21 reads out, from the memory 24, the form (for example, the form of a written agreement for automatic ordering) of the written agreement appropriate for the requirements for which input is received in the agreement input part 30. The CPU 21 then inputs the requirements (for example, Paper, Remaining amount, and 30%) in the read out form of the written agreement and thus generates the written agreement.

If the CANCEL button 34 is operated in the state illustrated in FIG. 6, the CPU 21 changes the screen of the display 26 to have a predetermined display.

FIG. 7 illustrates a second example display on the display 26 of the server 20. Specifically, the display example illustrated in FIG. 7 illustrates a state after the OK button 32 is operated in the display example illustrated in FIG. 6.

In the display example illustrated in FIG. 7, the OK button 32, the CANCEL button 34, and a preview display 36 are displayed.

The preview display 36 is a part where the written agreement generated by the CPU 21 is previewed. For example, the written agreement for the automatic ordering of Paper and Toner for which input is received in the agreement input part 30 illustrated in FIG. 6 is previewed in the preview display 36 illustrated in FIG. 7.

If the OK button 32 is operated in the state illustrated in FIG. 7, the CPU 21 proceeds to step S12 illustrated in FIG. 4 and executes the approval process. If the CANCEL button 34 is operated in the state illustrated in FIG. 7, the CPU 21 changes the screen of the display 26 to have a predetermined display.

Second Exemplary Embodiment

A second exemplary embodiment of the information processing system 10 according to this exemplary embodiment will then be described in such a manner that overlapping parts of other exemplary embodiments are omitted or simplified.

In the second exemplary embodiment, unlike the first exemplary embodiment, the image forming apparatus 60 is an example of the information processing apparatus, and the CPU 71 of the image forming apparatus 60 is an example of the processor. In addition, the ROM 72 or the memory 76 of the image forming apparatus 60 stores the information processing program for executing at least the implementation process.

The CPU 71 causes the display 77 to display pieces of information regarding settings implementable on the image forming apparatus 60 and receives the selection of one or more of the pieces of information regarding the settings by the user of the image forming apparatus 60.

Hereinafter, display examples based on the implementation process illustrated in FIG. 4 in the second exemplary embodiment will be described by using FIGS. 8 to 10. For example, in step S10 illustrated in FIG. 4, the CPU 71 causes the display 77 to display one of the respective display examples illustrated in FIGS. 8 to 10.

Figure 8:
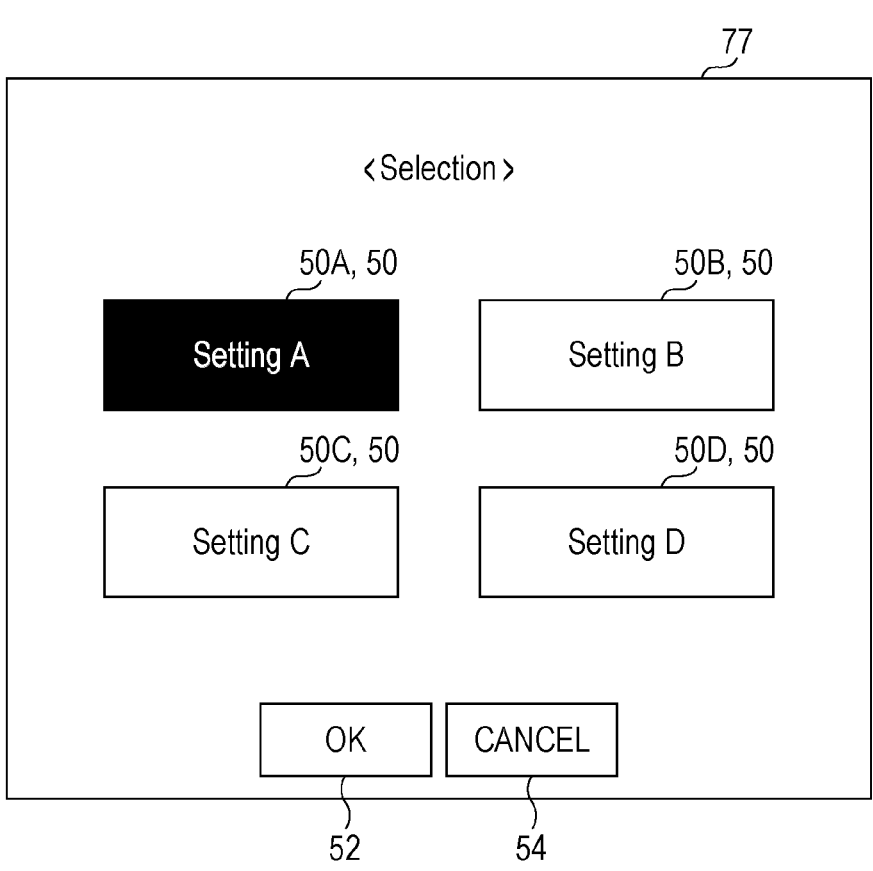
FIG. 8 illustrates a first example display on a display of the image forming apparatus.

FIG. 8 illustrates a first example display on the display 77 of the image forming apparatus 60.

In the display example illustrated in FIG. 8, setting parts 50, an OK button 52, and a CANCEL button 54 are displayed.

The setting parts 50 are parts where the pieces of information regarding settings implementable on the image forming apparatus 60 are displayed. In FIG. 8, a setting part 50A, a setting part 50B, a setting part 50C, and a setting part 50D respectively indicating that the respective pieces of information regarding the implementable settings are a setting A, a setting B, a setting C, and a setting D are displayed. The user of the image forming apparatus 60 may select one or more of the pieces of information regarding the settings represented by the one or more of the setting parts 50.

A setting part 50 having the rectangular field filled with black is herein a setting part 50 selected by the user. Specifically, FIG. 8 illustrates a state were the selection of the setting A indicated in the setting part 50A as the information regarding the setting is received in the setting parts 50.

If the OK button 52 is operated in the state illustrated in FIG. 8, the CPU 71 proceeds to step S11 illustrated in FIG. 4 and generates a written agreement relevant to the information regarding the setting for which the selection is received in the setting part 50. If the CANCEL button 54 is operated in the state illustrated in FIG. 8, the CPU 71 changes the screen of the display 77 to have a predetermined display.

As described above, the image forming apparatus 60 enables the user to select one or more of the pieces of information regarding one or more intended settings.

The CPU 71 also updates what is displayed on the display 77 regularly and presents a new piece of information regarding a setting to the user.

Figure 9:
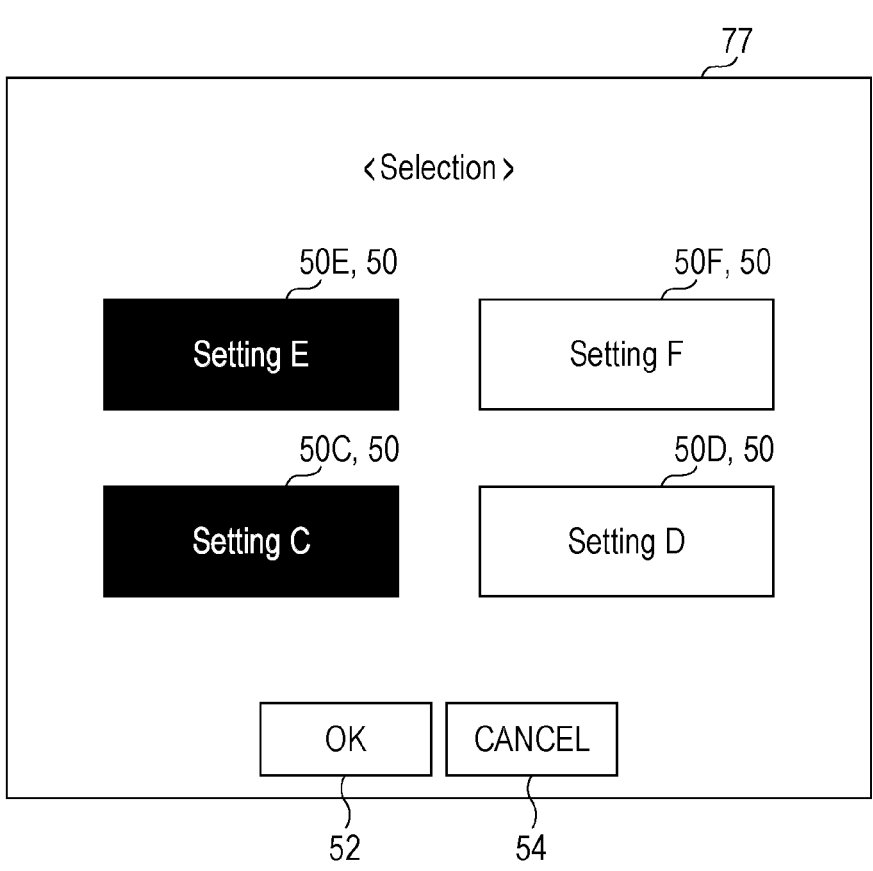
FIG. 9 illustrates a second example display on the display of the image forming apparatus.

FIG. 9 illustrates a second example display on the display 77 of the image forming apparatus 60. Specifically, the display example illustrated in FIG. 9 illustrates a state where a predetermined time has elapsed since the display example illustrated in FIG. 8 is displayed.

In FIG. 9, a setting part 50E and a setting part 50F are newly displayed as the setting parts 50, the setting part 50E and the setting part 50F respectively indicating that the pieces of information regarding the respective implementable settings are a setting E and a setting F. In FIG. 9, unlike FIG. 8, four setting parts 50 that are the setting part 50C, the setting part 50D, the setting part 50E, and the setting part 50F are thus displayed. FIG. 9 illustrates a state where the selection of the setting E indicated in the setting part 50E and the setting C indicated in the setting part 50C as the pieces of information regarding the settings is received in the setting parts 50.

If the OK button 52 is operated in the state illustrated in FIG. 9, the CPU 71 proceeds to step S11 illustrated in FIG. 4 and generates a written agreement relevant to the information regarding the setting for which the selection is received in the setting part 50. If the CANCEL button 54 is operated in the state illustrated in FIG. 9, the CPU 71 changes the screen of the display 77 to have a predetermined display.

As described above, the image forming apparatus 60 enables the user to comprehend new information regarding a setting.

Further, the CPU 71 may acquire usage information regarding the usage state of the image forming apparatus 60 and present, to the user, information regarding a setting appropriate for the acquired usage information. The usage information includes information such as remaining amounts of paper and toner.

Figure 10:
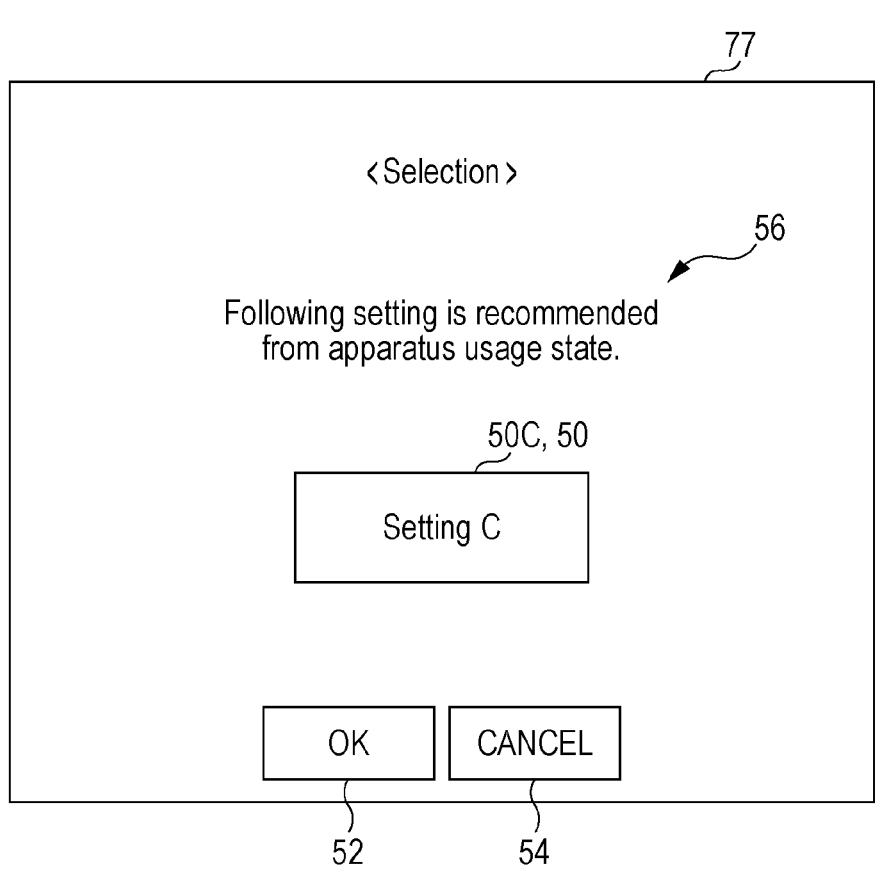
FIG. 10 illustrates a third example display on the display of the image forming apparatus.

FIG. 10 illustrates a third example display on the display 77 of the image forming apparatus 60.

In the display example illustrated in FIG. 10, the setting part 50, the OK button 52, the CANCEL button 54, and a message information 56 are displayed.

In the display example illustrated in FIG. 10, the setting part 50C is displayed as the setting part 50. For example, the CPU 71 acquires usage information stored in the memory 76 before displaying the display example illustrated in FIG. 10. The CPU 71 then decides information regarding a setting to be displayed in the setting part 50 on the basis of the acquired usage information and causes the display 77 to display the decided information regarding the setting (for example, the setting C).

The message information 56 indicates any of various massages to the user. For example, in FIG. 10, "Following setting is recommended from apparatus usage state" is displayed as the message information 56.

If the OK button 52 is operated in the state illustrated in FIG. 10, the CPU 71 proceeds to step S11 illustrated in FIG. 4 and generates a written agreement based on the setting C indicated in the setting part 50C. If the CANCEL button 54 is operated in the state illustrated in FIG. 10, the CPU 71 changes the screen of the display 77 to have a predetermined display.

As described above, the image forming apparatus 60 enables a setting appropriate for the usage state of the image forming apparatus 60 to be recommended to the user.

9

Others

In the exemplary embodiments above, the written agreement is presented to the approvers in the order from the provider to the user as the predetermined order; however, the presentation order is not limited to this. For example, the written agreement may be presented to the approvers in the order from the user to the provider as the predetermined order.

In the exemplary embodiments above, the written agreement is transmitted to the terminal of each approver and thereby is presented to the approver; however, the method of presenting the written agreement to the approver is not limited to this. For example, enabling the written agreement to be viewed from the terminals of the approvers by uploading the written agreement to a predetermined folder may be construed as presenting the written agreement to the approvers.

In the exemplary embodiments above, the agreement for the image forming apparatus 60 has been described as an amendment agreement for changing the content of an agreement for expendable supplies such as paper and toner; however the amendment agreement is not limited to that for the expendable supplies. For example, the amendment agreement may be an agreement for changing the content of an agreement for a setting regarding, for example, whether to perform color printing on the image forming apparatus 60 or for changing the content of an agreement for the number of leased image forming apparatus 60.

In the exemplary embodiments above, the provider apparatus 40 and the image forming apparatus 60 are allowed to communicate with each other through the network N; however, the communication method is not limited to this. Communications from the provider apparatus 40 to the image forming apparatus 60 may be prohibited. In addition, in the communications from the image forming apparatus 60 to the provider apparatus 40, transmittable information may be limited. For example, in the communications from the image forming apparatus 60 to the provider apparatus 40, transmission of information regarding the number of usable paper sheets, a remaining toner amount, or the like may be permitted, but transmission of personal information may be prohibited.

In the exemplary embodiments above, in the implementation process illustrated in FIG. 4, the CPU 21 transmits the change commands generated in step S13 to the provider apparatus 40 and the image forming apparatus 60; however the handling of the change commands is not limited to this. The change commands may be stored in a predetermined region of the server 20. In this case, the provider apparatus 40 and the image forming apparatus 60 perform polling. If the change command therefor is stored in the region, the change command is acquired from the region.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus includes:

a processor configured to:

receive input for an agreement for a predetermined apparatus;

present, to approvers, a written agreement generated on a basis of content of the received input; and cause the agreement to be concluded in response to the approvers approving the agreement and cause the predetermined apparatus to implement a setting relevant to content of the written agreement.

(((2)))

In the information processing apparatus according to (((1))), the approvers are present in respective parties to the agreement, and the processor is configured to:

present the written agreement to the approvers in a predetermined order.

(((3)))

In the information processing apparatus according to (((2))), the processor is configured to:

cause the agreement to be concluded in response to all of the approvers approving the agreement and cause the predetermined apparatus to implement the setting relevant to the content of the written agreement.

(((4)))

In the information processing apparatus according to (((2))) or (((3))), the processor is configured to:

in response to any of the approvers not approving the agreement, stop the agreement.

(((5)))

In the information processing apparatus according to any one of (((1))) to (((4))), the processor is configured to:

cause a display to display multiple pieces of information regarding respective settings implementable on the predetermined apparatus; and receive selection of a piece of information of the pieces of information regarding the respective settings, the selection being made by a user of the predetermined apparatus.

(((6)))

In the information processing apparatus according to (((5))), the processor is configured to:

regularly update what is displayed on the display and present a new piece of information regarding a setting to the user.

(((7)))

In the information processing apparatus according to (((5))) or (((6))), the processor is configured to:

acquire usage information regarding a usage state of the predetermined apparatus; and present, to the user, a setting appropriate for the acquired usage information.

(((8)))

An information processing program causes a computer to execute a process for information processing: the process including:

receiving input for an agreement for a predetermined apparatus;

presenting, to approvers, a written agreement generated on a basis of content of the received input; and causing the agreement to be concluded in response to the approvers approving the agreement and causing the predetermined apparatus to implement a setting relevant to content of the written agreement.

What is claimed is:

1. An information processing apparatus comprising:

a processor configured to:

receive input for an agreement for a predetermined apparatus;

present, to a plurality of approvers, a written agreement generated on a basis of content of the received input; and cause the written agreement to be concluded in response to the plurality of approvers approving the written agreement and cause the predetermined apparatus to implement a setting relevant to content of the written agreement, wherein:

the plurality of approvers includes a provider approver and a user approver, and the processor is further configured to transmit an approval request to the provider approver to approve the written agreement, and only after the provider approver approves the written agreement in response to the approval request, transmit another approval request to the user approver to approve the written agreement.

2. The information processing apparatus according to claim 1, wherein the plurality of approvers are present in respective parties to the agreement, and wherein the processor is configured to:

present the written agreement to the plurality of approvers in a predetermined order.

3. The information processing apparatus according to claim 2, wherein the processor is configured to:

cause the written agreement to be concluded in response to all of the plurality of approvers approving the written agreement and cause the predetermined apparatus to implement the setting relevant to the content of the written agreement.

4. The information processing apparatus according to claim 2, wherein the processor is configured to:

in response to any of the plurality of approvers not approving the agreement, stop the written agreement.

5. The information processing apparatus according to claim 1, wherein the processor is configured to:

cause a display to display a plurality of pieces of information regarding respective settings implementable on the predetermined apparatus; and receive selection of a piece of information of the plurality of pieces of information regarding the respective settings, the selection being made by a user of the predetermined apparatus.

6. The information processing apparatus according to claim 5, wherein the processor is configured to:

regularly update what is displayed on the display and present a new piece of information regarding a setting to the user.

7. The information processing apparatus according to claim 5, wherein the processor is configured to:

acquire usage information regarding a usage state of the predetermined apparatus; and present, to the user, a setting appropriate for the acquired usage information.

8. The information processing apparatus according to claim 1, wherein the written agreement defines one or more settings to be automatically implemented by the predetermined apparatus, and the processor is further configured to cause the predetermined apparatus to automatically implement the one or more settings defined in the written agreement.

9. A non-transitory computer readable medium storing program causing a computer to execute a process for information processing: the process comprising:

receiving input for an agreement for a predetermined apparatus;

presenting, to a plurality of approvers, a written agreement generated on a basis of content of the received input; and causing the written agreement to be concluded in response to the plurality of approvers approving the written agreement and causing the predetermined apparatus to implement a setting relevant to content of the written agreement, wherein:

the plurality of approvers includes a provider approver and a user approver, and the processor is further configured to transmit an approval request to the provider approver to approve the written agreement, and only after the provider approver approves the written agreement in response to the approval request, transmit another approval request to the user approver to approve the written agreement.

10. An information processing method comprising:

receiving input for an agreement for a predetermined apparatus;

presenting, to a plurality of approvers, a written agreement generated on a basis of content of the received input; and causing the written agreement to be concluded in response to the plurality of approvers approving the written agreement and causing the predetermined apparatus to implement a setting relevant to content of the written agreement, wherein:

the plurality of approvers includes a provider approver and a user approver, and the processor is further configured to transmit an approval request to the provider approver to approve the written agreement, and only after the provider approver approves the written agreement in response to the approval request, transmit another approval request to the user approver to approve the written agreement.

* * * * *